US011909612B2

(12) United States Patent
Basavaiah et al.

(10) Patent No.: US 11,909,612 B2
(45) Date of Patent: Feb. 20, 2024

(54) PARTITIONING HEALTH MONITORING IN A GLOBAL SERVER LOAD BALANCING SYSTEM

(71) Applicant: VMware LLC, Palo Alto, CA (US)

(72) Inventors: Murali Basavaiah, Los Altos, CA (US); Anand Parthasarathy, Fremont, CA (US); Sreeram Iyer, Bengaluru (IN); Sambit Kumar Das, Hayward, CA (US); Narasimhan Gomatam Mandeyam, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/102,696

(22) Filed: Jan. 28, 2023

(65) Prior Publication Data

US 2023/0171171 A1 Jun. 1, 2023

Related U.S. Application Data

(63) Continuation of application No. 16/746,785, filed on Jan. 17, 2020, now Pat. No. 11,582,120.

(Continued)

(51) Int. Cl.
*H04L 43/065* (2022.01)
*H04L 43/10* (2022.01)
(Continued)

(52) U.S. Cl.
CPC ........ *H04L 43/065* (2013.01); *H04L 43/0805* (2013.01); *H04L 43/10* (2013.01);
(Continued)

(58) Field of Classification Search
None
See application file for complete search history.

(56) References Cited

U.S. PATENT DOCUMENTS

| RE4,814 E | 3/1872 | Madurell |
| 5,109,486 A | 4/1992 | Seymour |

(Continued)

FOREIGN PATENT DOCUMENTS

| AU | 2011352884 A1 | 7/2013 |
| CA | 2607005 C | 2/2012 |
| WO | 2020086956 A1 | 4/2020 |

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.

(Continued)

*Primary Examiner* — Schquita D Goodwin
*Assistant Examiner* — Ishrat Rashid
(74) *Attorney, Agent, or Firm* — Quarles & Brady LLP

(57) ABSTRACT

Some embodiments provide a novel method of performing health monitoring for resources associated with a global server load balancing (GSLB) system. This system is implemented by several domain name system (DNS) servers that perform DNS services for resources located at several geographically separate sites. The method identifies several different groupings of the resources. It then assigns the health monitoring of the different resource groups to different DNS servers. The method then configures each particular DNS server (1) to send health monitoring messages to the particular group of resources assigned to the particular DNS server, (2) to generate data by analyzing responses to the sent health monitoring messages, and (3) to distribute the generated data to the other DNS servers. The method in some embodiments is performed by a set of one or more controllers.

20 Claims, 9 Drawing Sheets

Related U.S. Application Data

(60) Provisional application No. 62/854,792, filed on May 30, 2019.

(51) Int. Cl.
*H04L 67/1036* (2022.01)
*H04L 43/0805* (2022.01)
*H04L 47/783* (2022.01)
*H04L 47/70* (2022.01)
*H04L 67/1031* (2022.01)
*H04L 61/4511* (2022.01)

(52) U.S. Cl.
CPC .......... *H04L 47/783* (2013.01); *H04L 47/828* (2013.01); *H04L 61/4511* (2022.05); *H04L 67/1031* (2013.01); *H04L 67/1036* (2013.01)

(56) References Cited

U.S. PATENT DOCUMENTS

| | | |
|---|---|---|
| 5,781,703 A | 7/1998 | Desai et al. |
| 6,148,335 A | 11/2000 | Haggard et al. |
| 6,449,739 B1 | 9/2002 | Landan |
| 6,515,968 B1 | 2/2003 | Combar et al. |
| 6,714,979 B1 | 3/2004 | Brandt et al. |
| 6,754,706 B1 | 6/2004 | Swildens et al. |
| 6,792,458 B1 | 9/2004 | Muret et al. |
| 6,792,460 B2 | 9/2004 | Oulu et al. |
| 6,901,051 B1 | 5/2005 | Hou et al. |
| 6,976,090 B2 | 12/2005 | Ben-Shaul et al. |
| 6,996,778 B2 | 2/2006 | Rajarajan et al. |
| 7,076,695 B2 | 7/2006 | McGee et al. |
| 7,130,812 B1 | 10/2006 | Iyer et al. |
| 7,246,159 B2 | 7/2007 | Aggarwal et al. |
| 7,353,272 B2 | 4/2008 | Robertson et al. |
| 7,430,610 B2 | 9/2008 | Pace et al. |
| 7,636,708 B2 | 12/2009 | Garcea et al. |
| 7,701,852 B1 | 4/2010 | Hohn et al. |
| 7,743,380 B2 | 6/2010 | Seidman et al. |
| 7,933,988 B2 | 4/2011 | Nasuto et al. |
| 7,990,847 B1 | 8/2011 | Leroy et al. |
| 8,032,896 B1 | 10/2011 | Li et al. |
| 8,112,471 B2 | 2/2012 | Wei et al. |
| 8,131,712 B1 * | 3/2012 | Thambidorai ........ G06F 16/951 707/610 |
| 8,412,493 B2 | 4/2013 | Duchenay et al. |
| 8,499,066 B1 | 7/2013 | Zhang et al. |
| 8,588,069 B2 | 11/2013 | Todd et al. |
| 8,856,797 B1 | 10/2014 | Siddiqui et al. |
| 8,874,725 B1 | 10/2014 | Ganjam et al. |
| 8,977,728 B1 | 3/2015 | Martini |
| 9,032,078 B2 | 5/2015 | Beerse et al. |
| 9,047,648 B1 | 6/2015 | Lekutai et al. |
| 9,071,537 B2 | 6/2015 | Talla et al. |
| 9,083,710 B1 | 7/2015 | Yadav |
| 9,210,056 B1 | 12/2015 | Choudhary et al. |
| 9,256,452 B1 | 2/2016 | Suryanarayanan et al. |
| 9,288,193 B1 | 3/2016 | Gryb et al. |
| 9,300,552 B2 | 3/2016 | Dube et al. |
| 9,300,553 B2 | 3/2016 | Dube et al. |
| 9,319,343 B2 | 4/2016 | Khandelwal et al. |
| 9,329,915 B1 | 5/2016 | Chandrasekharapuram et al. |
| 9,450,700 B1 | 9/2016 | Tonder et al. |
| 9,459,980 B1 | 10/2016 | Arguelles |
| 9,467,476 B1 | 10/2016 | Shieh et al. |
| 9,477,784 B1 | 10/2016 | Bhave et al. |
| 9,483,286 B2 | 11/2016 | Basavaiah et al. |
| 9,491,164 B1 | 11/2016 | Fay et al. |
| 9,495,222 B1 | 11/2016 | Jackson |
| 9,531,614 B1 | 12/2016 | Nataraj et al. |
| 9,535,805 B2 | 1/2017 | Ananthanarayanan et al. |
| 9,558,465 B1 | 1/2017 | Arguelles et al. |
| 9,571,516 B1 | 2/2017 | Curcic et al. |
| 9,608,880 B1 | 3/2017 | Goodall |
| 9,613,120 B1 | 4/2017 | Kharatishvili et al. |
| 9,626,275 B1 | 4/2017 | Hitchcock et al. |
| 9,674,302 B1 | 6/2017 | Khalid et al. |
| 9,680,699 B2 | 6/2017 | Cohen et al. |
| 9,692,811 B1 | 6/2017 | Tajuddin et al. |
| 9,697,316 B1 | 7/2017 | Taylor et al. |
| 9,712,410 B1 | 7/2017 | Char et al. |
| 9,716,617 B1 | 7/2017 | Ahuja et al. |
| 9,729,414 B1 | 8/2017 | Oliveira et al. |
| 9,749,888 B1 | 8/2017 | Colwell et al. |
| 9,798,883 B1 | 10/2017 | Gil et al. |
| 9,817,699 B2 | 11/2017 | Stich et al. |
| 9,830,192 B1 | 11/2017 | Crouchman et al. |
| 9,882,830 B2 | 1/2018 | Taylor et al. |
| 9,935,829 B1 | 4/2018 | Miller et al. |
| 9,959,188 B1 | 5/2018 | Krishnan |
| 9,967,275 B1 | 5/2018 | Kolman et al. |
| 9,979,617 B1 | 5/2018 | Meyer et al. |
| 10,003,550 B1 | 6/2018 | Babcock et al. |
| 10,015,094 B1 | 7/2018 | Akers et al. |
| 10,127,097 B2 | 11/2018 | Talla et al. |
| 10,148,631 B1 | 12/2018 | Sokolov et al. |
| 10,212,041 B1 | 2/2019 | Rastogi et al. |
| 10,237,135 B1 | 3/2019 | Alabsi et al. |
| 10,313,211 B1 | 6/2019 | Rastogi et al. |
| 10,372,600 B2 | 8/2019 | Mathur |
| 10,547,521 B1 | 1/2020 | Roy et al. |
| 10,594,562 B1 | 3/2020 | Rastogi et al. |
| 10,630,543 B1 | 4/2020 | Wei et al. |
| 10,693,734 B2 | 6/2020 | Rastogi et al. |
| 10,728,121 B1 | 7/2020 | Chitalia et al. |
| 10,873,541 B2 | 12/2020 | Callau et al. |
| 10,931,548 B1 | 2/2021 | Iyer et al. |
| 10,999,168 B1 | 5/2021 | Gupta et al. |
| 11,038,839 B1 | 6/2021 | Vettaikaran et al. |
| 11,038,840 B1 | 6/2021 | Vettaikaran et al. |
| 11,044,180 B2 | 6/2021 | Rastogi et al. |
| 11,171,849 B2 | 11/2021 | Rastogi et al. |
| 11,283,697 B1 | 3/2022 | Rajagopalan et al. |
| 11,290,358 B2 | 3/2022 | Basavaiah et al. |
| 11,411,825 B2 | 8/2022 | Rastogi et al. |
| 11,513,844 B1 | 11/2022 | Aleti et al. |
| 11,582,120 B2 | 2/2023 | Basavaiah et al. |
| 11,736,372 B2 | 8/2023 | Rastogi et al. |
| 2002/0078150 A1 | 6/2002 | Thompson et al. |
| 2002/0198984 A1 | 12/2002 | Goldstein et al. |
| 2002/0198985 A1 | 12/2002 | Fraenkel et al. |
| 2003/0191837 A1 | 10/2003 | Chen |
| 2003/0236877 A1 | 12/2003 | Allan |
| 2004/0054680 A1 | 3/2004 | Kelley et al. |
| 2004/0064552 A1 | 4/2004 | Chong et al. |
| 2004/0103186 A1 | 5/2004 | Casati et al. |
| 2004/0143637 A1 | 7/2004 | Koning et al. |
| 2004/0243607 A1 | 12/2004 | Tummalapalli |
| 2005/0010578 A1 | 1/2005 | Doshi |
| 2005/0039104 A1 | 2/2005 | Shah et al. |
| 2005/0060574 A1 | 3/2005 | Klotz et al. |
| 2005/0108444 A1 | 5/2005 | Flauaus et al. |
| 2005/0120160 A1 | 6/2005 | Plouffe et al. |
| 2005/0172018 A1 | 8/2005 | Devine et al. |
| 2005/0188221 A1 | 8/2005 | Motsinger et al. |
| 2006/0167939 A1 | 7/2006 | Seidman et al. |
| 2006/0224725 A1 | 10/2006 | Bali et al. |
| 2006/0242282 A1 | 10/2006 | Mullarkey |
| 2006/0271677 A1 | 11/2006 | Mercier |
| 2007/0136331 A1 | 6/2007 | Hasan et al. |
| 2007/0226554 A1 | 9/2007 | Greaves et al. |
| 2008/0104230 A1 | 5/2008 | Nasuto et al. |
| 2008/0126534 A1 | 5/2008 | Mueller et al. |
| 2008/0183876 A1 | 7/2008 | Duvur et al. |
| 2009/0049524 A1 | 2/2009 | Farrell et al. |
| 2009/0154366 A1 | 6/2009 | Rossi |
| 2009/0199196 A1 | 8/2009 | Peracha |
| 2010/0030915 A1 | 2/2010 | Kiefer et al. |
| 2010/0077462 A1 | 3/2010 | Joffe et al. |
| 2010/0208742 A1 | 8/2010 | Kafle et al. |
| 2010/0279622 A1 | 11/2010 | Shuman et al. |
| 2010/0287171 A1 | 11/2010 | Schneider |
| 2010/0293296 A1 * | 11/2010 | Hsu ..................... H04L 67/1008 709/245 |

(56) References Cited

U.S. PATENT DOCUMENTS

| | | |
|---|---|---|
| 2011/0126111 A1 | 5/2011 | Gill et al. |
| 2011/0196890 A1 | 8/2011 | Pfeifle et al. |
| 2012/0101800 A1 | 4/2012 | Miao et al. |
| 2012/0110185 A1 | 5/2012 | Ganesan et al. |
| 2012/0131591 A1 | 5/2012 | Moorthi et al. |
| 2012/0254443 A1 | 10/2012 | Ueda |
| 2012/0254444 A1 | 10/2012 | Harchol-Balter et al. |
| 2012/0291099 A1 | 11/2012 | Grube et al. |
| 2013/0013953 A1 | 1/2013 | Eck et al. |
| 2013/0086230 A1 | 4/2013 | Guerra et al. |
| 2013/0086273 A1 | 4/2013 | Wray et al. |
| 2013/0151853 A1 | 6/2013 | Azzouz et al. |
| 2013/0179289 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0211559 A1 | 8/2013 | Lawson et al. |
| 2013/0212257 A1 | 8/2013 | Murase et al. |
| 2013/0290538 A1 | 10/2013 | Gmach et al. |
| 2013/0326044 A1 | 12/2013 | Maldaner |
| 2013/0326623 A1 | 12/2013 | Kruglick |
| 2013/0343213 A1 | 12/2013 | Reynolds et al. |
| 2013/0346594 A1 | 12/2013 | Banerjee et al. |
| 2014/0006862 A1 | 1/2014 | Jain et al. |
| 2014/0032785 A1 | 1/2014 | Chaudhuri et al. |
| 2014/0059179 A1 | 2/2014 | Lam |
| 2014/0101226 A1 | 4/2014 | Khandekar et al. |
| 2014/0122725 A1 | 5/2014 | Batrouni et al. |
| 2014/0143406 A1 | 5/2014 | Malhotra et al. |
| 2014/0173675 A1 | 6/2014 | Ahmed et al. |
| 2014/0215058 A1 | 7/2014 | Vicat-Blanc et al. |
| 2014/0215621 A1 | 7/2014 | Xaypanya et al. |
| 2014/0229706 A1 | 8/2014 | Kuesel et al. |
| 2014/0280886 A1 | 9/2014 | Burns |
| 2014/0282160 A1 | 9/2014 | Zarpas |
| 2014/0304414 A1 | 10/2014 | Yengalasetti et al. |
| 2014/0344439 A1 | 11/2014 | Kempf et al. |
| 2014/0351226 A1 | 11/2014 | Christodorescu et al. |
| 2014/0373140 A1 | 12/2014 | Waters, Jr. et al. |
| 2015/0058265 A1 | 2/2015 | Padala et al. |
| 2015/0074679 A1 | 3/2015 | Fenoglio et al. |
| 2015/0081880 A1 | 3/2015 | Eaton et al. |
| 2015/0106325 A1 | 4/2015 | Cole et al. |
| 2015/0106523 A1 | 4/2015 | Cui et al. |
| 2015/0124640 A1 | 5/2015 | Chu et al. |
| 2015/0134831 A1 | 5/2015 | Hiroishi |
| 2015/0199219 A1 | 7/2015 | Kim et al. |
| 2015/0212829 A1 | 7/2015 | Kupershtok et al. |
| 2015/0244626 A1 | 8/2015 | Childress et al. |
| 2015/0278061 A1 | 10/2015 | Siciliano et al. |
| 2015/0288682 A1 | 10/2015 | Bisroev et al. |
| 2015/0293954 A1 | 10/2015 | Hsiao et al. |
| 2015/0295780 A1 | 10/2015 | Hsiao et al. |
| 2015/0295796 A1 | 10/2015 | Hsiao et al. |
| 2015/0358391 A1 | 12/2015 | Moon et al. |
| 2015/0370852 A1 | 12/2015 | Shastry et al. |
| 2015/0381558 A1 | 12/2015 | Tuliani |
| 2016/0036837 A1 | 2/2016 | Jain et al. |
| 2016/0064277 A1 | 3/2016 | Park et al. |
| 2016/0065609 A1 | 3/2016 | Yan |
| 2016/0087879 A1 | 3/2016 | Matsubara et al. |
| 2016/0094401 A1 | 3/2016 | Anwar et al. |
| 2016/0094410 A1 | 3/2016 | Anwar et al. |
| 2016/0094431 A1 | 3/2016 | Hall et al. |
| 2016/0094483 A1 | 3/2016 | Johnston et al. |
| 2016/0103717 A1 | 4/2016 | Dettori et al. |
| 2016/0105335 A1 | 4/2016 | Choudhary et al. |
| 2016/0125330 A1 | 5/2016 | Borah |
| 2016/0127204 A1 | 5/2016 | Ozaki et al. |
| 2016/0149832 A1 | 5/2016 | Liang et al. |
| 2016/0162701 A1 | 6/2016 | Rosenberg et al. |
| 2016/0164738 A1 | 6/2016 | Pinski et al. |
| 2016/0182399 A1 | 6/2016 | Zadka et al. |
| 2016/0217022 A1 | 7/2016 | Velipasaoglu et al. |
| 2016/0294701 A1 | 10/2016 | Batrouni et al. |
| 2016/0294722 A1 | 10/2016 | Bhatia et al. |
| 2016/0323197 A1 | 11/2016 | Guzman et al. |
| 2016/0323377 A1 | 11/2016 | Einkauf et al. |
| 2016/0359719 A1 | 12/2016 | Travostino |
| 2016/0378635 A1 | 12/2016 | Taylor et al. |
| 2017/0041386 A1 | 2/2017 | Bhat et al. |
| 2017/0063933 A1 | 3/2017 | Shieh et al. |
| 2017/0093986 A1 | 3/2017 | Kim et al. |
| 2017/0126792 A1 | 5/2017 | Halpern et al. |
| 2017/0134481 A1 | 5/2017 | DeCusatis et al. |
| 2017/0195090 A1 | 7/2017 | Boidol et al. |
| 2017/0295207 A1 | 10/2017 | Yu et al. |
| 2017/0324555 A1 | 11/2017 | Wu et al. |
| 2017/0331907 A1 | 11/2017 | Jagannath et al. |
| 2017/0344618 A1 | 11/2017 | Horowitz et al. |
| 2018/0004582 A1 | 1/2018 | Hallenstål |
| 2018/0007126 A1 | 1/2018 | Borst et al. |
| 2018/0018244 A1 | 1/2018 | Yoshimura et al. |
| 2018/0041408 A1 | 2/2018 | Dagum et al. |
| 2018/0041470 A1 | 2/2018 | Schultz et al. |
| 2018/0046482 A1 | 2/2018 | Karve et al. |
| 2018/0063193 A1* | 3/2018 | Chandrashekhar ... G06F 15/177 |
| 2018/0088935 A1 | 3/2018 | Church et al. |
| 2018/0089328 A1 | 3/2018 | Bath et al. |
| 2018/0136931 A1 | 5/2018 | Hendrich et al. |
| 2018/0239651 A1 | 8/2018 | Gong et al. |
| 2018/0287902 A1 | 10/2018 | Chitalia et al. |
| 2018/0302375 A1 | 10/2018 | Els |
| 2018/0309637 A1 | 10/2018 | Gill et al. |
| 2018/0335946 A1 | 11/2018 | Wu et al. |
| 2018/0367596 A1 | 12/2018 | Bache et al. |
| 2019/0014102 A1 | 1/2019 | Mathew et al. |
| 2019/0121672 A1 | 4/2019 | Ding et al. |
| 2019/0123970 A1 | 4/2019 | Rastogi et al. |
| 2019/0199790 A1* | 6/2019 | Yang ................... H04L 67/1029 |
| 2019/0238505 A1 | 8/2019 | Richards et al. |
| 2019/0297014 A1 | 9/2019 | Azgin et al. |
| 2020/0014594 A1 | 1/2020 | Lapiotis et al. |
| 2020/0136939 A1 | 4/2020 | Rastogi et al. |
| 2020/0136942 A1 | 4/2020 | Rastogi et al. |
| 2020/0142788 A1 | 5/2020 | Hu et al. |
| 2020/0169479 A1 | 5/2020 | Ireland |
| 2020/0218571 A1 | 7/2020 | Chen |
| 2020/0287794 A1 | 9/2020 | Rastogi et al. |
| 2020/0374039 A1 | 11/2020 | Rau et al. |
| 2020/0382390 A1 | 12/2020 | Basavaiah et al. |
| 2020/0382584 A1 | 12/2020 | Basavaiah et al. |
| 2021/0058453 A1 | 2/2021 | Balasubramanian et al. |
| 2021/0119923 A1 | 4/2021 | Brown et al. |
| 2021/0349749 A1 | 11/2021 | Guha |
| 2021/0373971 A1 | 12/2021 | Lu et al. |
| 2022/0141102 A1 | 5/2022 | Rastogi et al. |
| 2022/0147390 A1 | 5/2022 | Akinapelli et al. |
| 2022/0231949 A1 | 7/2022 | Ramaswamy et al. |
| 2022/0237203 A1 | 7/2022 | Das et al. |
| 2022/0286373 A1 | 9/2022 | Rajagopalan et al. |
| 2022/0353201 A1 | 11/2022 | Navali et al. |
| 2022/0368758 A1 | 11/2022 | Suri et al. |
| 2022/0400097 A1 | 12/2022 | Rao et al. |
| 2022/0400098 A1 | 12/2022 | Rao et al. |
| 2023/0018908 A1 | 1/2023 | Yue et al. |
| 2023/0024475 A1 | 1/2023 | Mandeyam et al. |
| 2023/0025679 A1 | 1/2023 | Mandeyam et al. |
| 2023/0052818 A1 | 2/2023 | Jain et al. |

OTHER PUBLICATIONS

Author Unknown, "Autoscaling," Aug. 20, 2015, 4 pages, Amazon Web Services, retrieved from http://web.archive.org/web/20150820193921/https://aws.amazon.com/autoscaling/.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-bpfilter-what-are-these-things-and-what-do-they-mean-enterprise/.

Catania, V., et al., "PMT: A Tool to Monitor Performances in Distributed Systems," Proceedings of the 3rd IEEE International

(56) References Cited

OTHER PUBLICATIONS

Symposium on High Performance Distributed Computing, Aug. 2-5, 1994, 8 pages, San Francisco, CA, USA.
Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.
De George, Andy, "How to Scale an Application," Jun. 16, 2015, 8 pages, Github.com.
Liu, Feng, et al., "Monitoring of Grid Performance Based on Agent," 2007 2nd International Conference on Pervasive Computing and Applications, Jul. 26-27, 2007, 6 pages, IEEE, Birmingham, UK.
Non-Published commonly Owned U.S. Appl. No. 16/905,571, filed Jun. 18, 2020, 40 pages, VMware, Inc.
Sevcik, Peter, et al., "Apdex Alliance," May 24, 2014, 5 pages, www.apdex.org.
Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.
Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.
Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

\* cited by examiner

PARTITIONING HEALTH MONITORING IN A GLOBAL SERVER LOAD BALANCING SYSTEM

CLAIM OF BENEFIT TO PRIOR APPLICATION

This application is a continuation application of U.S. patent application Ser. No. 16/746,785, filed Jan. 17, 2020, now published as U.S. Patent Publication 2020/0382584. U.S. patent application Ser. No. 16/746,785 claims the benefit of U.S. Provisional Patent Application 62/854,792, filed May 30, 2019. U.S. patent application Ser. No. 16/746,785, now published as U.S. Patent Publication 2020/0382584, is incorporated herein by reference.

Large-scale clustered environments host numerous servers, sometimes on the order of thousands of servers or more. The servers may be implemented using various virtual devices such as containers, virtual machines, and the like. It may be difficult to monitor the health of the servers and manage traffic among the servers in these environments. For example, the health of a cluster of servers is determined from various factors such as individual server health, application health, and network connectivity. Conventional techniques for monitoring a group of servers and providing a network service typically involve instantiating a service provider (e.g., a monitoring service) on each application server in the cluster of servers. For clustered environments with a large number of nodes, such deployments are computationally expensive and power intensive. Thus, there is a need in the art for effective health monitoring and traffic management for large-scale clustered.

BRIEF SUMMARY

Some embodiments provide a novel method of performing health monitoring for resources associated with a global server load balancing (GSLB) system. This system is implemented by several domain name system (DNS) servers that perform DNS services for resources located at several geographically separate sites. The method identifies several different groupings of the resources. It then assigns the health monitoring of the different resource groups to different DNS servers. The method then configures each particular DNS server (1) to send health monitoring messages to the particular group of resources assigned to the particular DNS server, (2) to generate data by analyzing responses to the sent health monitoring messages, and (3) to distribute the generated data to the other DNS servers. The method in some embodiments is performed by a set of one or more controllers.

In some embodiments, the health monitoring is performed for resources that include load balancers that forward data messages to backend servers. The load balancers include different clusters of load balancers responsible for forwarding data message flows among different sets of backend servers located at different geographical sites. In some embodiments, each load balancer cluster is in the same geographical site as the set of backend servers to which it forwards data messages.

In other embodiments, the monitored resources include backend servers that process and respond to the data message flows. The DNS servers in some embodiments receive DNS requests for at least one application executed by each backend server, and in response to the DNS requests, provide network addresses to access the backend servers. The network addresses in some embodiments include different VIP (virtual Internet Protocol) addresses that direct the data message flows to different clusters of load balancers that distribute the load among the backend servers.

Some of the health-monitoring messages have formats that allow the load balancers to respond, while other health-monitoring messages have formats that require the backend servers to process the messages and respond. For instance, a load balancer responds to a simple ping message, while a backend server needs to respond to an https message directed to a particular operation of an application that is identified by a particular domain name address.

As mentioned above, each DNS server in some embodiments is configured to analyze responses to the health monitoring messages that it sends, to generate data based on this analysis, and to distribute the generated data to the other DNS servers. The generated data is used to identify a first set of resources that have failed, and/or a second set of resources that have poor operational performance (e.g., have operational characteristics that fail to meet desired operational metrics).

In some embodiments, each particular DNS server is configured to identify (e.g., to generate) statistics from responses that each particular resource sends to the health monitoring messages from the particular DNS server. Each time the DNS server generates new statistics for a particular resource, the DNS server in some embodiments aggregates the generated statistics with statistics it previously generated for the particular resource (e.g., by computing a weighted sum) over a duration of time. In some embodiments, each DNS server periodically distributes to the other DNS severs the statistics it identifies for the resources that are assigned to it. The DNS server directly distributes the statistics to the other DNS servers in some embodiments, while it distributes the statistics indirectly through the controller set in other embodiments.

The DNS servers in some embodiments analyze the generated and distributed statistics to assess the health of the monitored resources, and adjust the way they distribute the data message flows when they identify failed or poorly performing resources through their analysis. In some embodiments, the DNS servers are configured similarly to analyze the same set of statistics in the same way to reach the same conclusions. Instead of distributing generated statistics regarding a set of resources, the monitoring DNS server in other embodiments generates health metric data from the generated statistics, and distributes the health metric data to the other DNS servers.

The DNS servers in some embodiments are part of two or more DNS server clusters. In some embodiments, the different DNS clusters are in different datacenters, which can be in different geographical sites (e.g., different neighborhoods, different cities, different states, different countries, etc.). Also, in some embodiments, one or more DNS server clusters are in one or more private datacenters, while one or more other DNS server clusters are in one or more public datacenters.

To send its health monitoring messages, each DNS server has a resource selector and a health monitor in some embodiments. The resource selector of the DNS server specifies the resources to which the DNS server should send health monitoring messages. For instance, in some embodiments, the resource selector has a mapping table that associates different resources with different DNS servers, and consults this table to identify the resources to which the health monitor of its DNS server should send health monitoring messages. The mapping table in some embodiments is a hash lookup table (e.g., a hash wheel) that identifies different DNS servers for different ranges of hash values.

The resource selector generates a hash value from the identifier of each resource and uses the generated hash value as an index into the hash lookup table to identify the DNS server for the resource.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel sharding method for performing health monitoring of resources associated with a global server load balancing (GSLB) system. The method of some embodiments partitions the responsibility for the monitoring the health of different groups of resources among several domain name system (DNS) servers that perform DNS services for resources located at several geographically separate sites.

Figure 1:
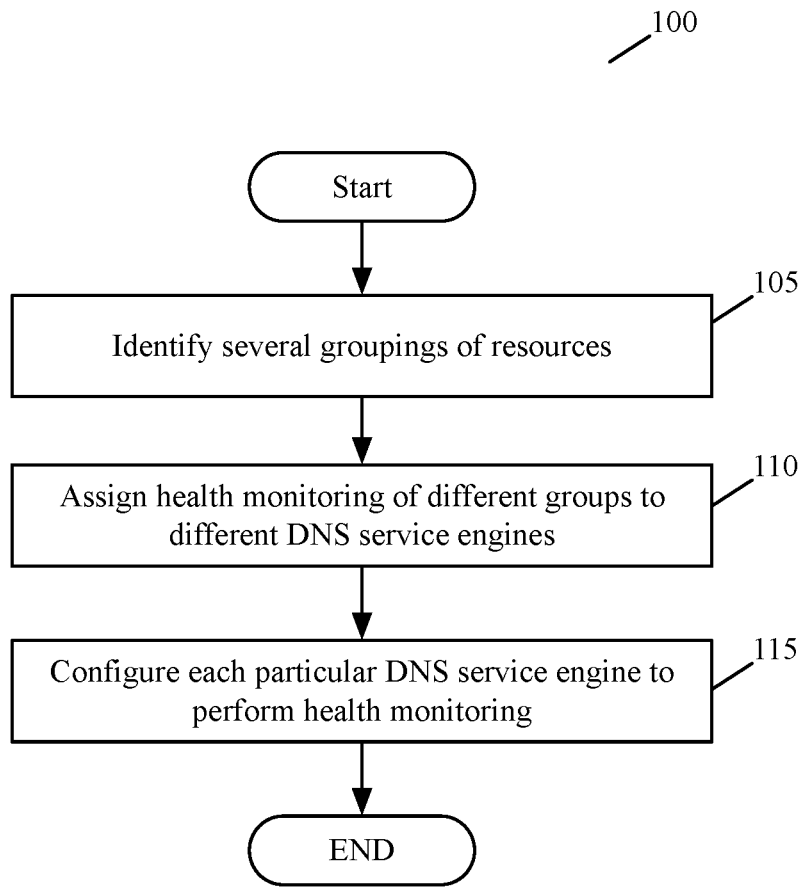
FIG. 1 illustrates a process that implements the method of some embodiments.

FIG. 1 illustrates a process 100 that implements the method of some embodiments. The process 100 will be described by reference to an example of a GSLB system 200 of FIG. 2. As shown, the GSLB system 200 includes a set of controllers 205, several DNS service engines 210 and several groups 225 of resources 215. The DNS service engines are the DNS servers that perform DNS operations for (e.g., provide network addresses for domain names provided by) machines 220 that need to forward data message flows to the resources 215.

Figure 2:
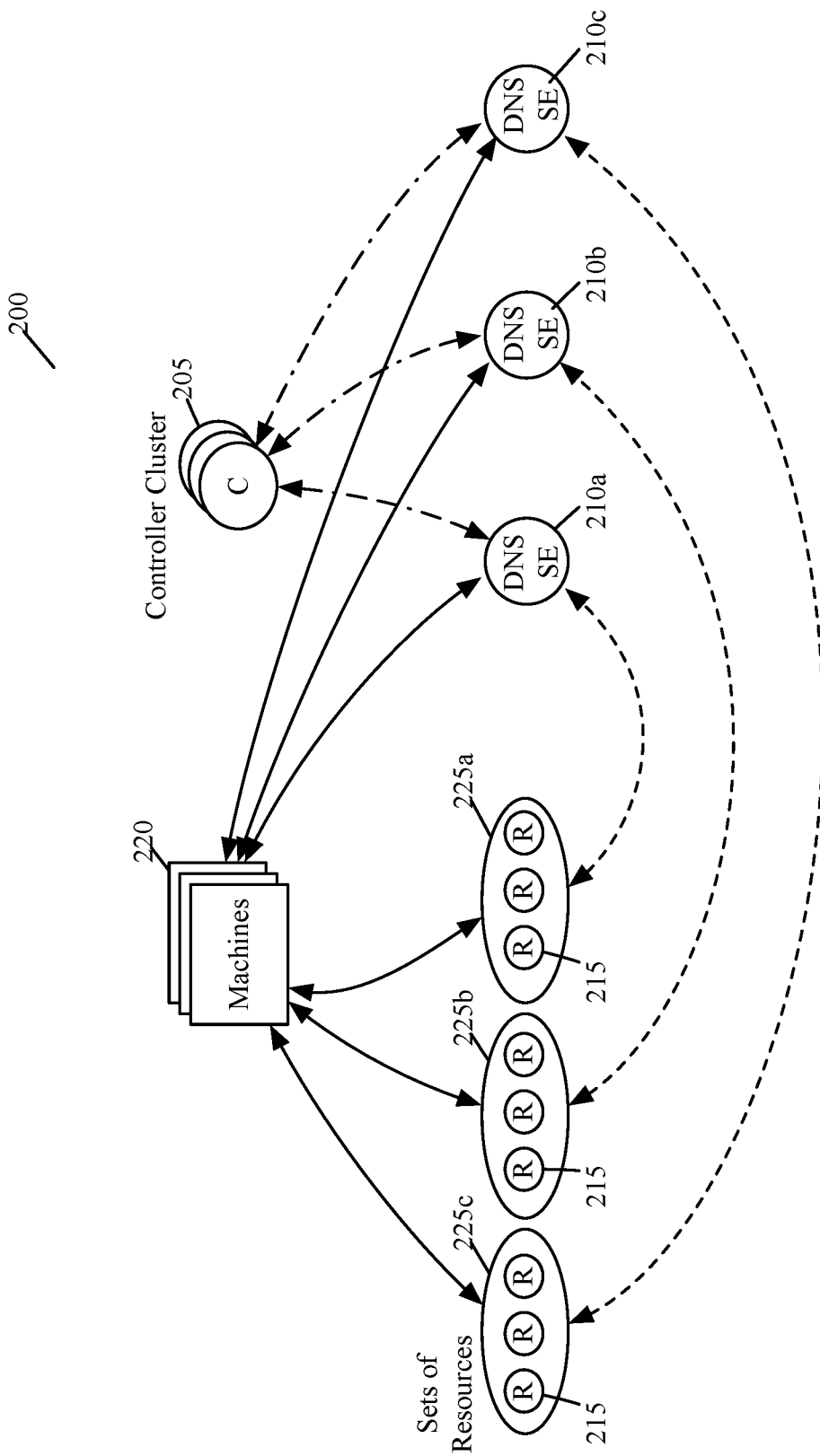
FIG. 2 illustrates a GSLB system that uses the process of some embodiments.

In some embodiments, the controller set 205 performs the process 100. As shown, the process 100 starts by the controller set 205 identifying (at 105) several groupings 225 of the resources 215. The process 100 next assigns (at 110) the health monitoring of the different groups to different DNS service engines. In FIG. 2, the DNS service engine 210a is assigned to check the health of the resource group 225a, the DNS service engine 210b is assigned to check the health of the resource group 225b, and the DNS service engine 210c is assigned to check the health of the resource group 225c. This association is depicted by one set of dashed lines in FIG. 2.

The process 100 configures (at 115) each particular DNS service engine (1) to send health monitoring messages to the particular group of resources assigned to the particular DNS service engine, (2) to generate data by analyzing responses of the resources to the health monitoring messages, and (3) to distribute the generated data to the other DNS service engines. FIG. 2 depicts with another set of dashed lines control communication channel between the controller set 205 and the DNS service engines 210. Through this channel, the controller set configures the DNS service engines. The DNS service engines in some embodiments also provide through this channel the data that they generate based on the responses of the resources to the health monitoring messages. After 115, the process 100 ends.

In some embodiments, the resources 215 that are subjects of the health monitoring are the backend servers that process and respond to the data message flows from the machines 220. The DNS service engines 210 in some embodiments receive DNS requests from the machines 220 for at least one application executed by each of the backend servers, and in response to the DNS requests, provide network addresses to access the backend servers.

The network addresses in some embodiments include different VIP (virtual Internet Protocol) addresses that direct the data message flows to different clusters of load balancers that distribute the load among the backend servers. Each load balancer cluster in some embodiments is in the same geographical site as the set of backend servers to which it forwards data messages. In other embodiments, the load balancers are the resources that are subject of the health monitoring. In still other embodiments, the resources that are subject to the health monitoring include both the load balancers and the backend servers.

Different embodiments use different types of health monitoring messages. Several examples of such messages are described below including ping messages, TCP messages, UDP messages, https messages, and http messages. Some of these health-monitoring messages have formats that allow the load balancers to respond, while other health-monitoring messages have formats that require the backend servers to process the messages and respond. For instance, a load balancer responds to a simple ping message, while a backend server needs to respond to an https message directed to a particular function associated with a particular domain address.

As mentioned above, each DNS service engine 210 in some embodiments is configured to analyze responses to the health monitoring messages that it sends, to generate data based on this analysis, and to distribute the generated data to the other DNS service engines. In some embodiments, the generated data is used to identify a first set of resources that have failed, and/or a second set of resources that have poor operational performance (e.g., have operational characteristics that fail to meet desired operational metrics).

In some embodiments, each particular DNS service engine 210 is configured to identify (e.g., to generate) statistics from responses that each particular resource sends to the health monitoring messages from the particular DNS service engine. Each time the DNS service engine 210 generates new statistics for a particular resource, the DNS service engine in some embodiments aggregates the generated statistics with statistics it previously generated for the particular resource (e.g., by computing a weighted sum) over a duration of time. In some embodiments, each DNS service engine 210 periodically distributes to the other DNS severs the statistics it identifies for the resources that are assigned to it. Each DNS service engine 210 directly distributes the statistics that it generates to the other DNS service engines in some embodiments, while it distributes the statistics indirectly through the controller set 205 in other embodiments.

The DNS service engines in some embodiments analyze the generated and distributed statistics to assess the health of the monitored resources, and adjust the way they distribute the data message flows when they identify failed or poorly performing resources through their analysis. In some embodiments, the DNS service engines are configured similarly to analyze the same set of statistics in the same way to reach the same conclusions. Instead of distributing generated statistics regarding a set of resources, the monitoring DNS service engines in other embodiments generate health metric data from the generated statistics, and distribute the health metric data to the other DNS service engines.

Figure 3:
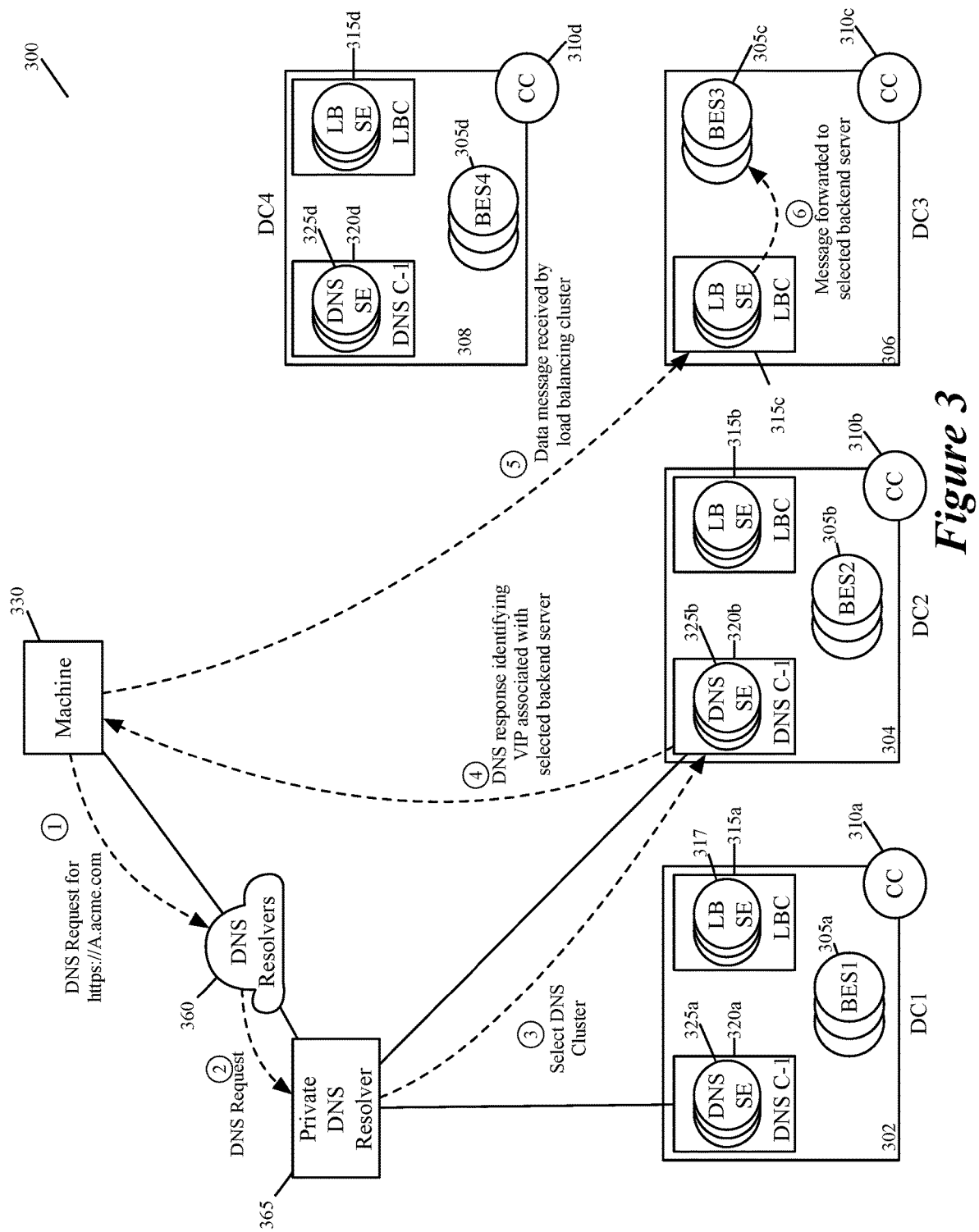
FIG. 3 illustrates a more detailed example of a GSLB system that uses the sharding method of some embodiments of the invention.

FIG. 3 illustrates a more detailed example of a GSLB system 300 that uses the sharding method of some embodiments of the invention. In this example, backend application servers 305 are deployed in four datacenters 302-308, three of which are private datacenters 302-306 and one of which is a public datacenter 308. The datacenters in this example are in different geographical sites (e.g., different neighborhoods, different cities, different states, different countries, etc.).

A cluster of one or more controllers 310 are deployed in each datacenter 302-308. Each datacenter also has a cluster 315 of load balancers 317 to distribute the data message load across the backend application servers 305 in the datacenter. In this example, three datacenters 302, 304 and 308 also have a cluster 320 of DNS service engines 325 to perform DNS operations to process (e.g., to provide network addresses for domain names provided by) for DNS requests submitted by machines 330 inside or outside of the datacenters. In some embodiments, the DNS requests include requests for fully qualified domain name (FQDN) address resolutions.

FIG. 3 illustrates the resolution of an FQDN that refers to a particular application "A" that is executed by the servers of the domain acme.com. As shown, this application is accessed through https and the URL "A.acme.com". The DNS request for this application is resolved in three steps. First, a public DNS resolver 360 initially receives the DNS request and forwards this request to the private DNS resolver 365 of the enterprise that owns or manages the private datacenters 302-306.

Second, the private DNS resolver 365 selects one of the DNS clusters 320. This selection is random in some embodiments, while in other embodiments it is based on a set of load balancing criteria that distributes the DNS request load across the DNS clusters 320. In the example illustrated in FIG. 3, the private DNS resolver 365 selects the DNS cluster 320b of the datacenter 304.

Third, the selected DNS cluster 320b resolves the domain name to an IP address. In some embodiments, each DNS cluster includes multiple DNS service engines 325, such as DNS service virtual machines (SVMs) that execute on host computers in the cluster's datacenter. When a DNS cluster 320 receives a DNS request, a frontend load balancer (not shown) in some embodiments selects a DNS service engine 325 in the cluster to respond to the DNS request, and forwards the DNS request to the selected DNS service engine. Other embodiments do not use a frontend load balancer, and instead have a DNS service engine serve as a frontend load balancer that selects itself or another DNS service engine in the same cluster for processing the DNS request.

The DNS service engine 325b that processes the DNS request then uses a set of criteria to select one of the backend server clusters 305 for processing data message flows from the machine 330 that sent the DNS request. The set of criteria for this selection in some embodiments (1) includes the health metrics that are generated from the health monitoring that the DNS service engines perform, or (2) is generated from these health metrics, as further described below. Also, in some embodiments, the set of criteria include load balancing criteria that the DNS service engines use to distribute the data message load on backend servers that execute application "A."

In the example illustrated in FIG. 3, the selected backend server cluster is the server cluster 305c in the private datacenter 306. After selecting this backend server cluster 305c for the DNS request that it receives, the DNS service engine 325b of the DNS cluster 320b returns a response to the requesting machine. As shown, this response includes the VIP address associated with the selected backend server cluster 305. In some embodiments, this VIP address is associated with the local load balancer cluster 315c that is in the same datacenter 306 as the selected backend server cluster.

After getting the VIP address, the machine 330 sends one or more data message flows to the VIP address for a backend server cluster 305 to process. In this example, the data message flows are received by the local load balancer cluster 315c. In some embodiments, each load balancer cluster 315 has multiple load balancing engines 317 (e.g., load balancing SVMs) that execute on host computers in the cluster's datacenter.

When the load balancer cluster receives the first data message of the flow, a frontend load balancer (not shown) in some embodiments selects a load balancing service engine 317 in the cluster to select a backend server 305 to receive the data message flow, and forwards the data message to the selected load balancing service engine. Other embodiments do not use a frontend load balancer, and instead have a load balancing service engine in the cluster serve as a frontend load balancer that selects itself or another load balancing service engine in the same cluster for processing the received data message flow.

When a selected load balancing service engine 317 processes the first data message of the flow, this service engine uses a set of load balancing criteria (e.g., a set of weight values) to select one backend server from the cluster of backend servers 305c in the same datacenter 306. The load balancing service engine then replaces the VIP address with an actual destination IP (DIP) address of the selected backend server, and forwards the data message and subsequent data messages of the same flow to the selected back end server. The selected backend server then processes the data message flow, and when necessary, sends a responsive data message flow to the machine 330. In some embodiments, the responsive data message flow is through the load balancing service engine that selected the backend server for the initial data message flow from the machine 330.

Like the controllers 205, the controllers 310 facilitate the health-monitoring method that the GSLB system 300 performs in some embodiments. The controllers 310 perform the process 100 of FIG. 1, to define groups of load balancers 317 and/or backend servers 305 to monitor, to assign the different groups to different DNS service engines 325, and to configure these servers and/or clusters to perform the health monitoring.

Figure 4:
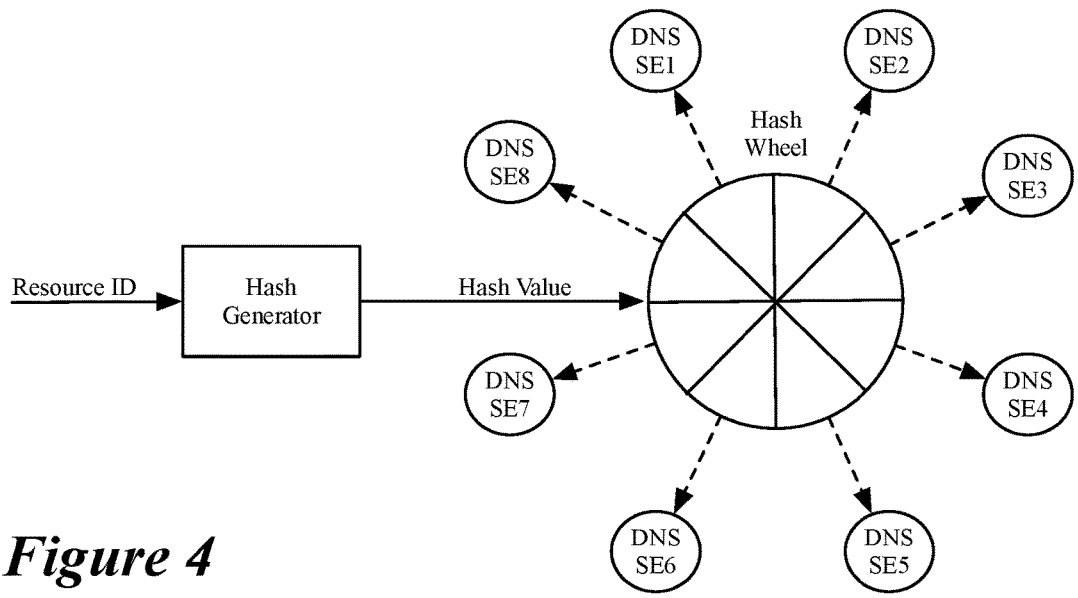
FIG. 4 illustrates an example of a hash wheel.

In some embodiments, the controllers 310 generate and update a hash wheel that associates different DNS service engines 325 with different load balancers 317 and/or backend servers 305 to monitor. FIG. 4 illustrates an example of a hash wheel 400. As shown, this wheel 400 has several different ranges of hash values, with each range associated with one of eight different DNS service engines 405. In some embodiments, the controllers 310 provide each DNS service engine 405 with a copy of this hash wheel, and a hash generator 410 (e.g., a hash function) that generates a hash value from different identifiers of different resources that are to be monitored. For each resource, each DNS service engine 405 in some embodiments (1) uses the hash generator 410 to generate a hash value from the resource's identifier, (2) identifies the hash range that contains the generated hash value, (3) identifies the DNS service engine associated with the identified hash range, and (4) adds the resource to its list of resources to monitor when it is the identified DNS service engine identified by the hash wheel for the resource.

In some embodiments, the controllers 310 assign the different resources (e.g., load balancers 317 and/or backend servers 325) to the different DNS clusters 320, and have each cluster determines how to distribute the health monitoring load among its own DNS service engines. Still other embodiments use other techniques to shard the health monitoring responsibility among the different DNS service engines 325 and clusters 320.

In some embodiments, the controllers 310 also collect health-monitoring data that their respective DNS service engines 325 (e.g., the DNS service engines in the same datacenters as the controllers) generate, and distribute the health-monitoring data to other DNS service engines 325. In some embodiments, a first controller in a first datacenter distributes health-monitoring data to a set of DNS service engines in a second datacenter by providing this data to a second controller in the second datacenter to forward the data to the set of DNS service engines in the second datacenter. Even though FIG. 3 and its accompanying discussion refer to just one controller in each datacenter 302-308, one of ordinary skill will realize that in some embodiments a cluster of two or more controllers are used in each datacenter 302-308.

Figure 5:
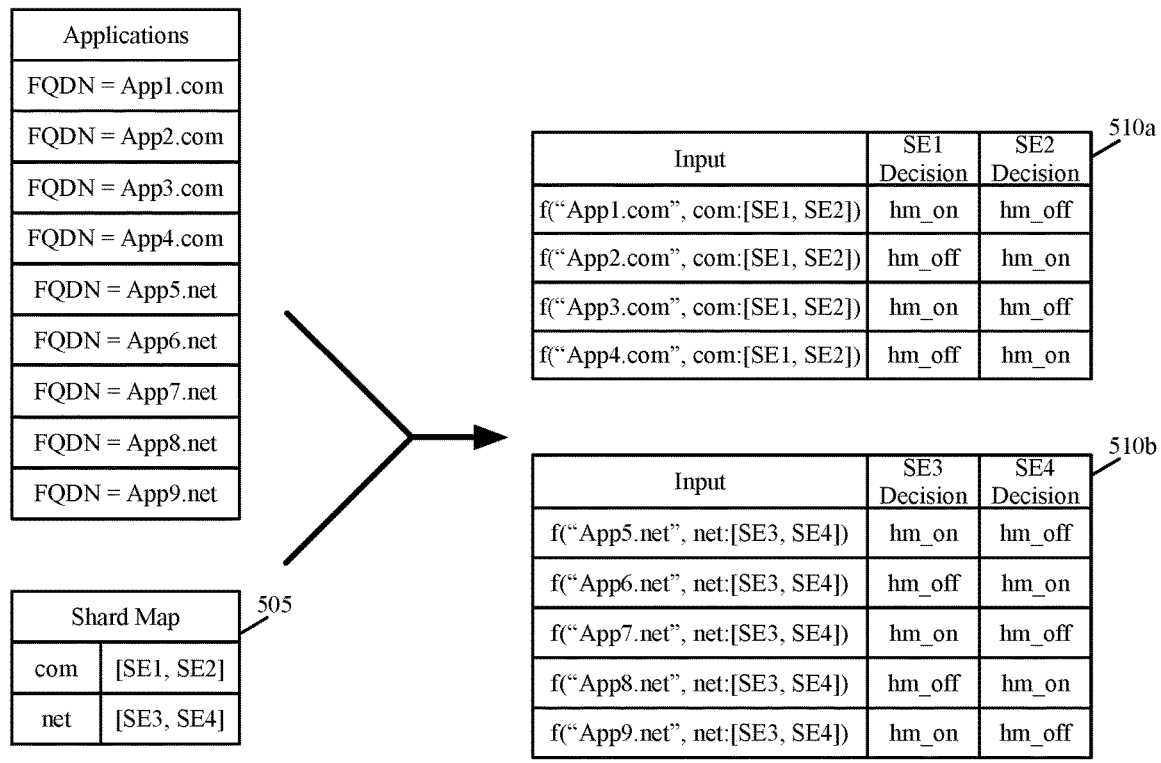
FIGS. 5-11 provides additional example of how the controller cluster shards the health monitoring across the DNS service engines.

FIGS. 5-11 provides additional example of how the controller cluster shards (i.e., partitions) the health monitoring across the DNS service engines. FIG. 5 illustrates an example of using two sets of sharding maps to distribute the health monitoring load across for nine distributed applications across four DNS service engines. The nine applications are App1-App9, the first four of which have .com FQDNs, while the last five have .net FQDNs. Each of these applications is executed by two or more backend servers.

As shown, a first shard map 505 associates the .com FQDNs with the first pair of DNS service engines SE1 and SE2, and the .net FQDNs with the second pair of DNS service engines SE3 and SE4. Two second set shard maps 510a and 510b then associate each DNS service engine in the two DNS-server pairs to one of the nine applications. Specifically, the shard map 510a associates the DNS service engine SE1 to monitor App1 and App3, and DNS service engine SE2 to monitor App2 and App4, while the shard map 510b associates the DNS service engine SE3 to monitor App5, App7 and App9, and DNS service engine SE4 to monitor App6 and App8.

Figure 6:
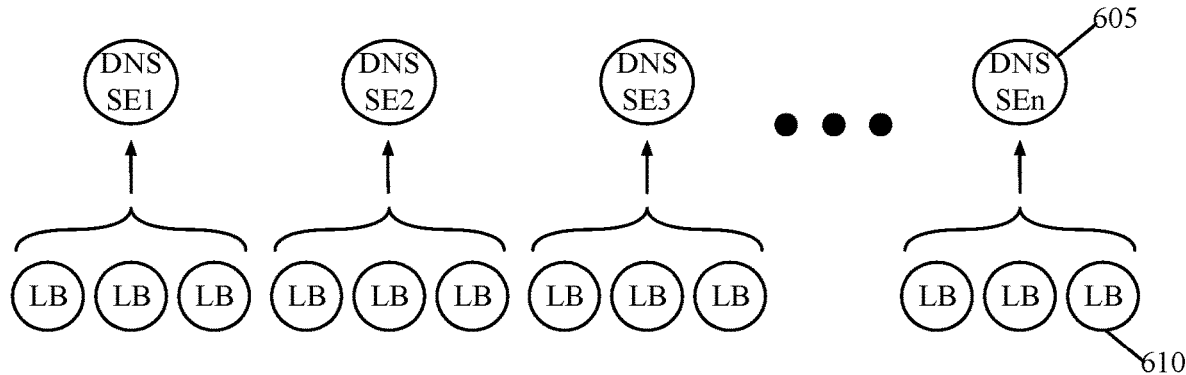
Figure 7:
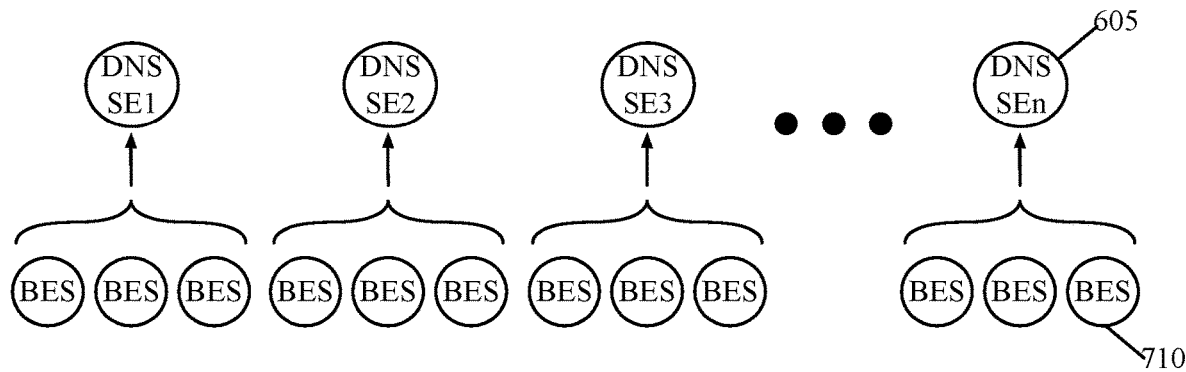
Figure 8:
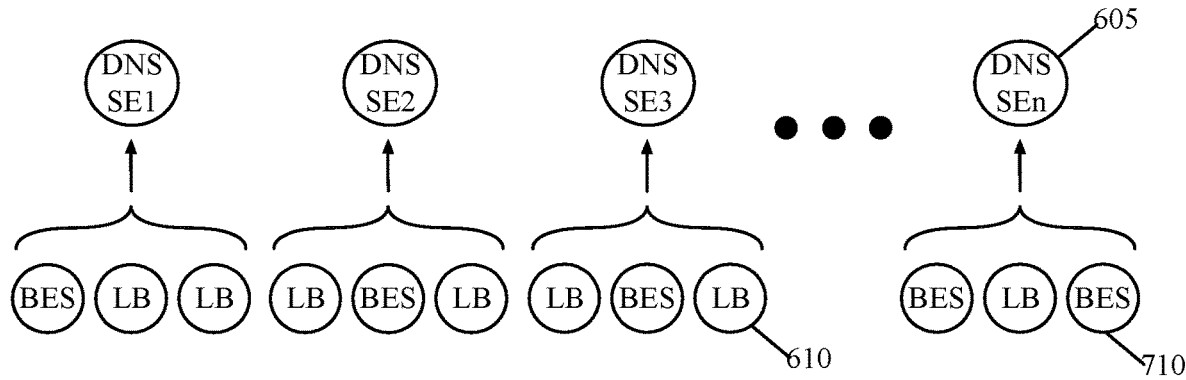

FIG. 6 illustrates an example of partitioning the health monitoring of different load balancers 610 in one or more datacenters across different DNS service engines 605, while FIG. 7 illustrates an example of partitioning the health monitoring of different backend servers 710 in one or more datacenters across different DNS service engines 605. FIG. 8 illustrates an example of partitioning the health monitoring of different combination of load balancers 610 and backend servers 710 across different DNS service engines 605. In these figures, the DNS service engines 605 in some embodiments are in the same datacenters as the load balancers 610 and backend servers 710 that they monitor, while in other embodiments the DNS service engines 605 can monitor the health of load balancers 610 and backend servers 710 in the same datacenter as, or in different datacenters than, the DNS service engines.

Figure 9:
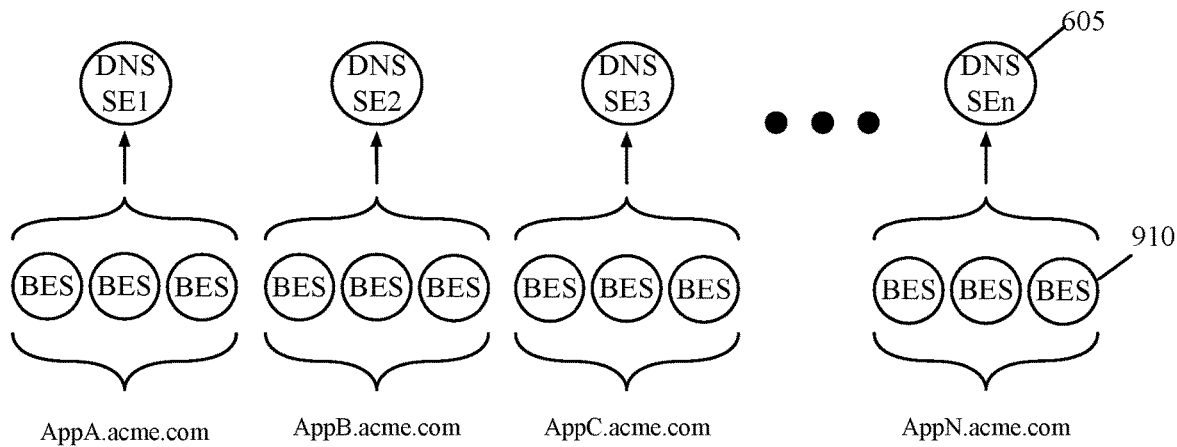

FIG. 9 illustrates an example of partitioning the health monitoring of different distributed applications across different DNS service engines 605. This figure illustrates N distributed applications, each of which in this example are executed on three backend servers. Each application is associated with a different FQDN. This figure illustrates N DNS service engines 605 with each of these DNS service engines monitoring the health of all the backend servers that execute one of the N distributed applications.

Each of the DNS service engines acts as a health monitoring (HM) proxy for one distributed application. As the HM proxy for its associated application, the DNS service engine sends health monitoring messages to the backend servers that execute its application, generates health monitoring data from the backend servers' responses to the its health monitoring messages, and then distributes health monitoring data to the other DNS service engines 605 directly or through one or more controllers.

Figure 10:
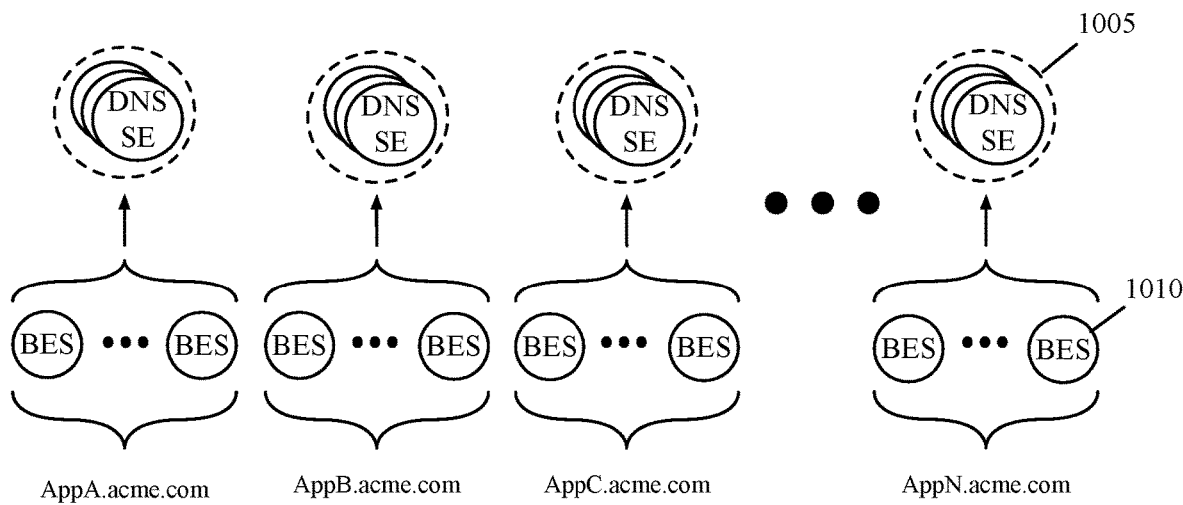

FIG. 10 illustrates another example of DNS service engines operating as HM proxies. In this example, the health monitoring of N distributed applications is partitioned among N different DNS sever clusters 1005, with each cluster having multiple different DNS service engines. In each cluster, the health monitoring of the backend servers that execute that cluster's associated application is distributed among the DNS service engines of that cluster.

Each DNS service engine sends health monitoring messages to the backend servers that execute the application of its cluster, generates health monitoring data from the backend servers' responses to the health monitoring messages, and then distributes health monitoring data to the other DNS service engines 1005 of its cluster and other clusters directly or through one or more controllers. In some embodiments, each cluster has one DNS service engine or controller aggregate the health monitoring data of the DNS service engines of that cluster, and then forward the aggregated health monitoring data to the other DNS service engines 605 of its cluster and other clusters.

Figure 11:
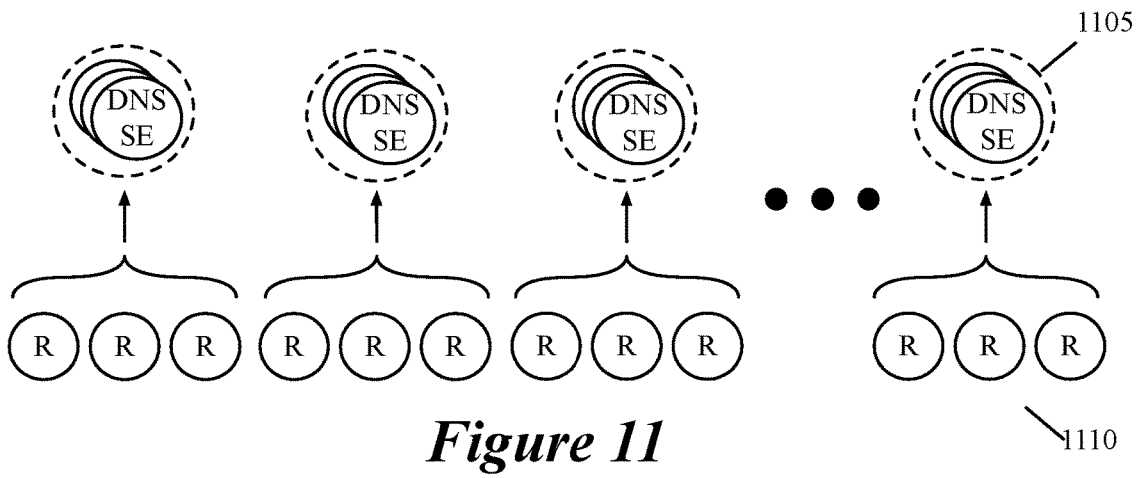

In FIG. 10, one DNS cluster monitors the backend servers of one distributed application. In other examples, one DNS cluster can monitor the backend servers of two or more distributed applications. Also, as shown in FIG. 11, different DNS clusters 1105 in some embodiments are responsible for performing health monitoring for different sets 1110 of arbitrary resources, such as load balancers and/or backend servers. For instance, in some embodiments, one or more DNS clusters are responsible for monitoring the health of one or more sets of load balancers, while one or more other DNS clusters are responsible for monitoring the health of one or more sets of backend servers. In some embodiments, each DNS cluster 1105 monitors the health of the load balancers and/or backend servers in its own datacenter.

As mentioned above, each DNS service engine in some embodiments has a resource selector and a health monitor that facilitate its health monitoring operation. The resource selector of the DNS service engine specifies the resources to which the DNS service engine should send health monitoring messages, while its health monitor sends the health monitoring messages to the resources identified by the resource selector.

Figure 12:
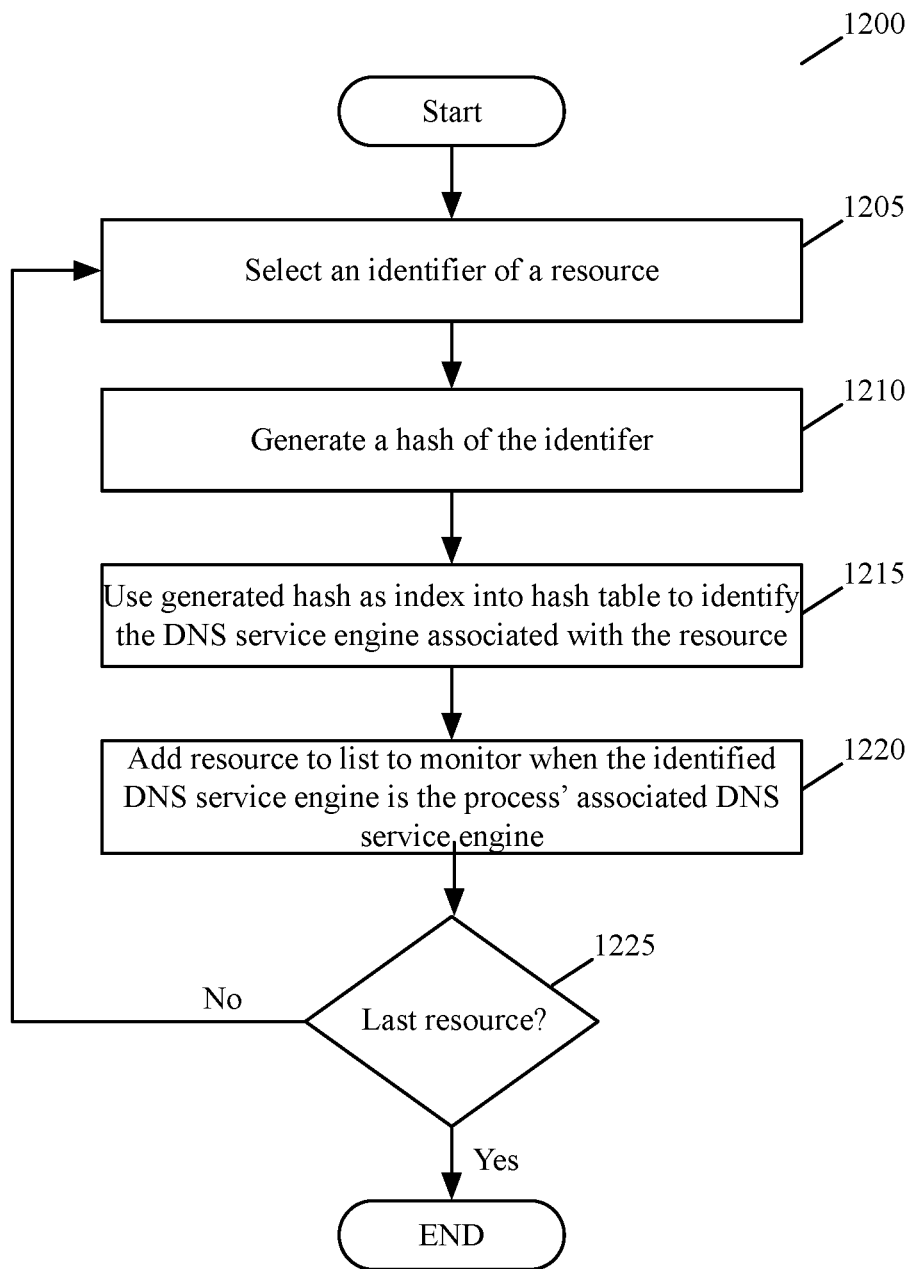
FIG. 12 illustrates a process that the resource selector of a DNS service engine performs in some embodiments.

FIG. 12 illustrates a process 1200 that the resource selector of a DNS service engine performs in some embodiments. The resource selector performs this process each time that it receives, from a controller, a new or updated list of resources, and/or a new hash lookup table that maps resources to DNS service engines. As shown, the process 1200 selects (at 1205) an identifier (e.g., UUID, universal unique identifier) of a resource for which the process 1200 has to identify a DNS service engine that will monitor the resource's health. In some embodiments, the selected resource might be one that the resource selector examined in prior iterations of the process 1200, but has to examine again as it has received a new hash lookup table.

Next, at 1210, the process 1200 uses a hash function to generate a hash value for the identifier selected at 1205. In some embodiments, the controller cluster configures the DNS service engines to use the same hash function for all the resources to monitor, or for all resources of a certain type or certain locale. After generating the hash value, the process 1200 uses (at 1215) the generated value as an index into the hash table that associates different DNS service engines with different ranges of hash values. In other words, the process (at 1215) identifies the lookup table hash range that contains the generated hash value, and identifies the DNS service engine specified for this hash range. As described above by reference to FIG. 4, the hash table in some embodiments is a hash wheel.

At 1220, the process 1200 adds the resource identified at 1205 to a list of resource to monitor for the health monitor of its associated DNS service engine, when the DNS service engine identified at 1215 is the process' associated DNS service engine. In other words, the DNS service engine's resource selector directs its server's health monitor to monitor a resource identified at 1205, when the hash of this resource's identifier falls into a hash range of the lookup table that is identified with the resource selector's DNS service engine.

After 1225, the process determines whether it has examined all the resources that are on a list of resources for it to examine to identify their health monitoring DNS service engine. In some embodiments, the list of resources to examine just includes newly added resources, while including all the resources in other cases when the hash lookup table is updated. When the process has examined all the resources, it ends. Otherwise, it returns to 1205 to select an identifier of another resource to examine.

Figure 13:
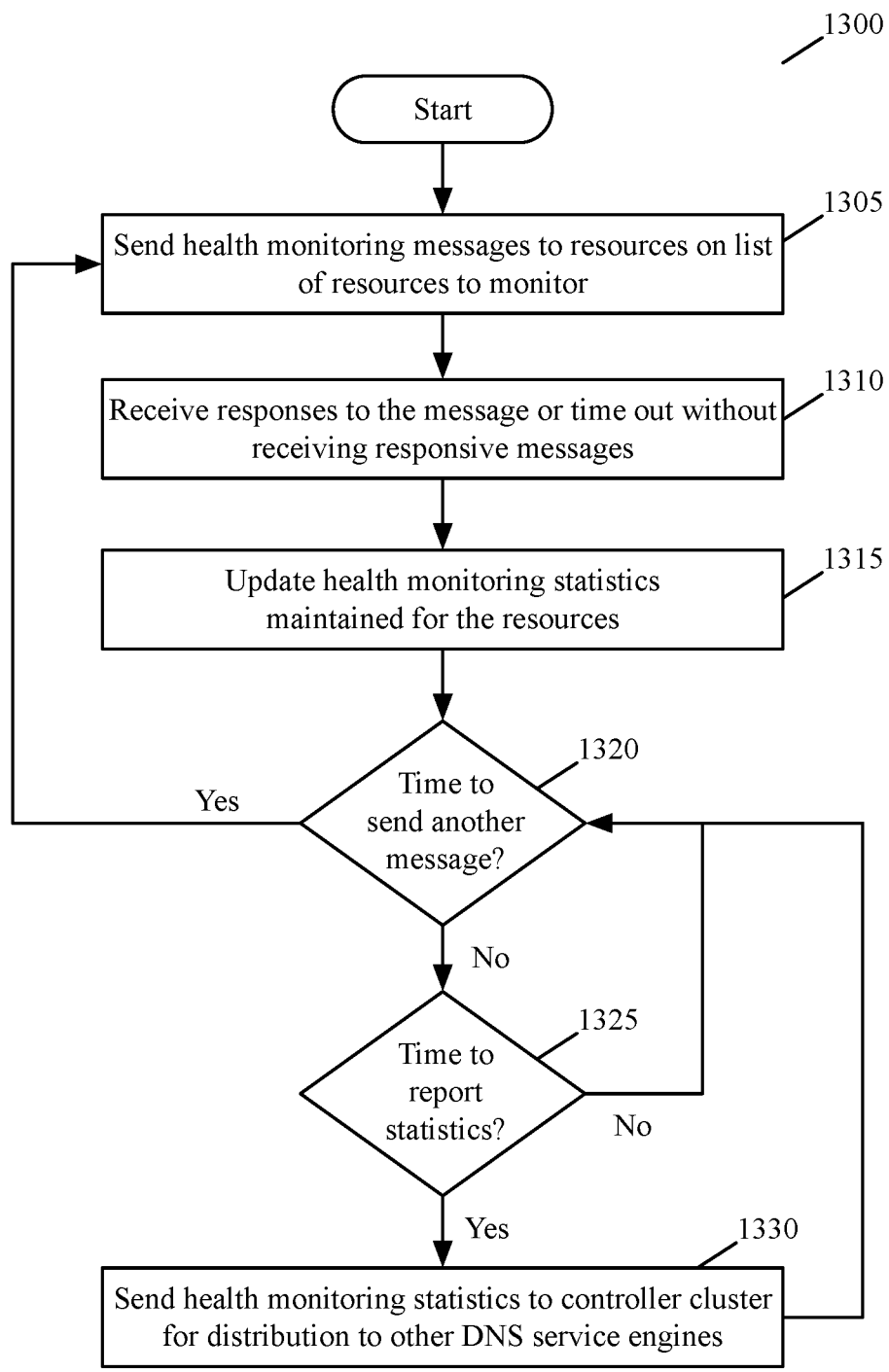
FIG. 13 illustrates a process that the health monitor of a DNS service engine performs in some embodiments.

FIG. 13 illustrates a process 1300 that the health monitor of a DNS service engine performs in some embodiments. The health monitor in some embodiments performs this process continuously for the set of resources that the DNS service engine has been assigned to monitor. As shown, the process 1300 sends (at 1305) health monitoring messages to resources identified on the list of resources that the DNS service engine has to monitor. In some embodiments, this list is compiled by the process 1200 of the resource selector of the DNS service engine, as mentioned above. Examples of health monitoring messages will be further described below.

At 1310, the process 1300 receives responses to the health monitoring messages, or times out without receiving responses to these messages from one or more resources. Based on responses to health monitoring messages, the process 1300 generates (at 1315) statistics in some embodiments. For instance, in some embodiments, the process 1300 maintains (at 1315) an average response time for a resource to respond to health monitoring messages.

In these embodiments, each time the health monitor of the DNS service engine receives a HM response to an HM message from a resource, it identifies the time duration between sending the message and receiving the response, and blends this identified response time duration with a running response-time average that the health monitor maintains for the resource. For a particular resource, the health monitor computes the blended response time by computing a weighted sum of the response time measurements that it collects and stores over a duration of time in some embodiments. In other embodiments, for a resource, the health monitor simply computes the weighted sum of the response time that it identified for the resource at 1310 with the blended average that it previously computed and stored for the resource.

Next, at 1320, the process determines whether it has reached the time for sending another round of health monitoring messages to the resources on its list of resources to monitor. If so, it transitions to 1305 to repeat its operations. Otherwise, at 1325, the process determines whether it has reached the time to report the statistics that it has generated for its monitored set of resources. If not, it returns to 1320.

As mentioned above, each DNS service engine in some embodiments periodically distributes to the other DNS service engines the statistics it identifies for the resources that are assigned to it for health monitoring. Hence, when the process determines (at 1325) that it has reached the time to report the statistics, the process sends the health monitoring statistics that it has generated since its last reporting to the local controller or controller cluster in the same datacenter as its DNS service engine. The local controller or controller cluster then distributes these statistics (1) to other DNS service engines in the same datacenter as the local controller or controller cluster, and (2) to other controllers in other datacenters to forward to other DNS service engines in their respective datacenters. In other embodiments, the process 1300 directly distributes its statistics to the other DNS service engines in its DNS cluster, and/or other DNS clusters.

The DNS service engines in some embodiments analyze the generated and distributed statistics to assess the health of the monitored resources, and adjust the way they distribute the data message flows when they identify failed or poorly performing resources through their analysis. In some embodiments, the DNS service engines are configured similarly to analyze the same set of statistics in the same way to reach the same conclusions.

Instead of distributing generated statistics regarding a set of resources, the monitoring DNS service engine in other embodiments generates health metric data from the generated statistics, and distributes the health metric data to the other DNS service engines directly or indirectly through the controllers. Each DNS service engine analyzes the health metric data that it generates and that it receives from other DNS service engines, and based on this analysis, adjusts the way it distributes the data message flows when it identifies failed or poorly performing resources through its analysis.

In some embodiments, a DNS service engine adjusts its data message flow distribution by foregoing sending of data message flows to failed resources, and by reducing or eliminating the sending of data message flows to poorly performing resources (i.e., resource with poor health monitoring statistics). For instance, in the embodiments in which a DNS service engine uses a set of load balancing criteria to distribute the data message load across a number of resources, the DNS service engine adjusts its load balancing criteria based on the health monitoring statistics that are collected and shared by all the DNS service engines for the set of resources.

As mentioned above, different embodiments use different types of health monitoring messages, such as HTTP messages, HTTPs messages, ping messages, TCP messages, and UDP messages. Health monitoring messages have four configurable properties in some embodiments: (1) a frequency at which the health monitor initiates a resource check, (2) a maximum amount of time before the resource must return a valid response to the health monitor, (3) a number of consecutive health checks that must succeed before marking a down resource as operational again, and (4) a number of consecutive health checks that must fail before marking a function resource as being down.

Some embodiments use simple ping messages for health monitoring. In some embodiments, the ping health-monitoring messages are ICMP pings sent from the DNS service engines to the resources. Ping messages in some embodiments do not test the health of the applications executing on backend servers, but rather just measure the responsiveness of the resource to which the ping is directed. In some embodiments, the ping health monitor of the DNS service engine is configured to detect an anomaly with the resource only after a certain number (e.g., two or more) of successive ping messages fail to receive a response. This is because it is not uncommon for a response to a ping health-monitoring message to get dropped.

In some embodiments, the HTTP health-monitoring messages can be configured in four ways: (1) an HTTP request, (2) a specified range in which the resource is expected to return a response code within, (3) response data which is matched against the first 2 KB of data returned from the resource, and (4) a port that should be used for the health check. The HTTP request in some embodiments contains a method, a path, a version, a host, and a carriage return, and each of these components can be configured for the specific HM deployment.

In some embodiments, the HTTPs health-monitoring messages can be configured in the same four-ways as the HTTP health-monitoring messages. Some embodiments use HTTPs health monitoring messages for their HM deployments when the client machines and backend servers have to establish encrypted HTTPs connections that are load balanced by the DNS service engines and the local load balancing clusters. Some embodiments also use HTTPs health monitoring messages for their HM deployments when the client traffic arrives as HTTP or HTTPs communication, and a cluster of modules in the SDDC terminate the clients connections, establish secure connections to the destination backend servers, and pass along the client data messages along the secure connections.

Some embodiments use TCP health monitoring messages when the monitored application is a TCP application. The TCP health monitor wait for a TCP connection to be established. It then sends a request string, and waits for the resource to respond with the expected content. If no client request and resource response are configured, the resource in some embodiments will be marked as one with a successful TCP handshake.

The TCP health monitoring message can be configured in four ways in some embodiments: (1) a send string which is sent to the resource immediately after completing the TCP three-way handshake, (2) an expected resource response that is checked to determine whether it is contained within the first 2 KB of data returned by the resource, (3) a specified port for the health check, and (4) a half open option. When the half open option is used, the TCP health monitoring message in some embodiments also sends a SYN message. Upon receipt of an ACK message, the resource is marked up and the DNS service engine responds with an RST. In some embodiments, the TCP handshake is never fully completed. Hence, in these embodiments, the application health is not validated. The purpose of this monitor option is to identify potential applications that do not gracefully handle quick termination. By never completing the handshake, the application is not touched. No application logs are generated or application resources wasted setting up a connection from the health monitor.

Some embodiments send UDP health monitoring messages as UDP datagrams to the resources, and then match the responses of the resources against the expected response data. The UDP can be configured in three ways: (1) a send string, (2) an expected resource response that is checked to determine whether it is contained within the first 2 KB of data returned from the resource, and (3) a specified port for the health check.

When the HM deployments use HTTP, HTTPs, TCP and UDP health monitoring messages, some embodiments allow a resource to be marked as disabled through a custom resource response in a Maintenance Resource Response option. After a resource has been marked as disabled through this option, health checks in some embodiments will continue, and resources operate the same as if manually disabled, which means existing client flows are allowed to continue, but new flows are sent to other available resources. Once a resource stops responding with the maintenance string, some embodiments bring the resource back online, assuming that there is no other fault with the resource that needs to be resolved.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
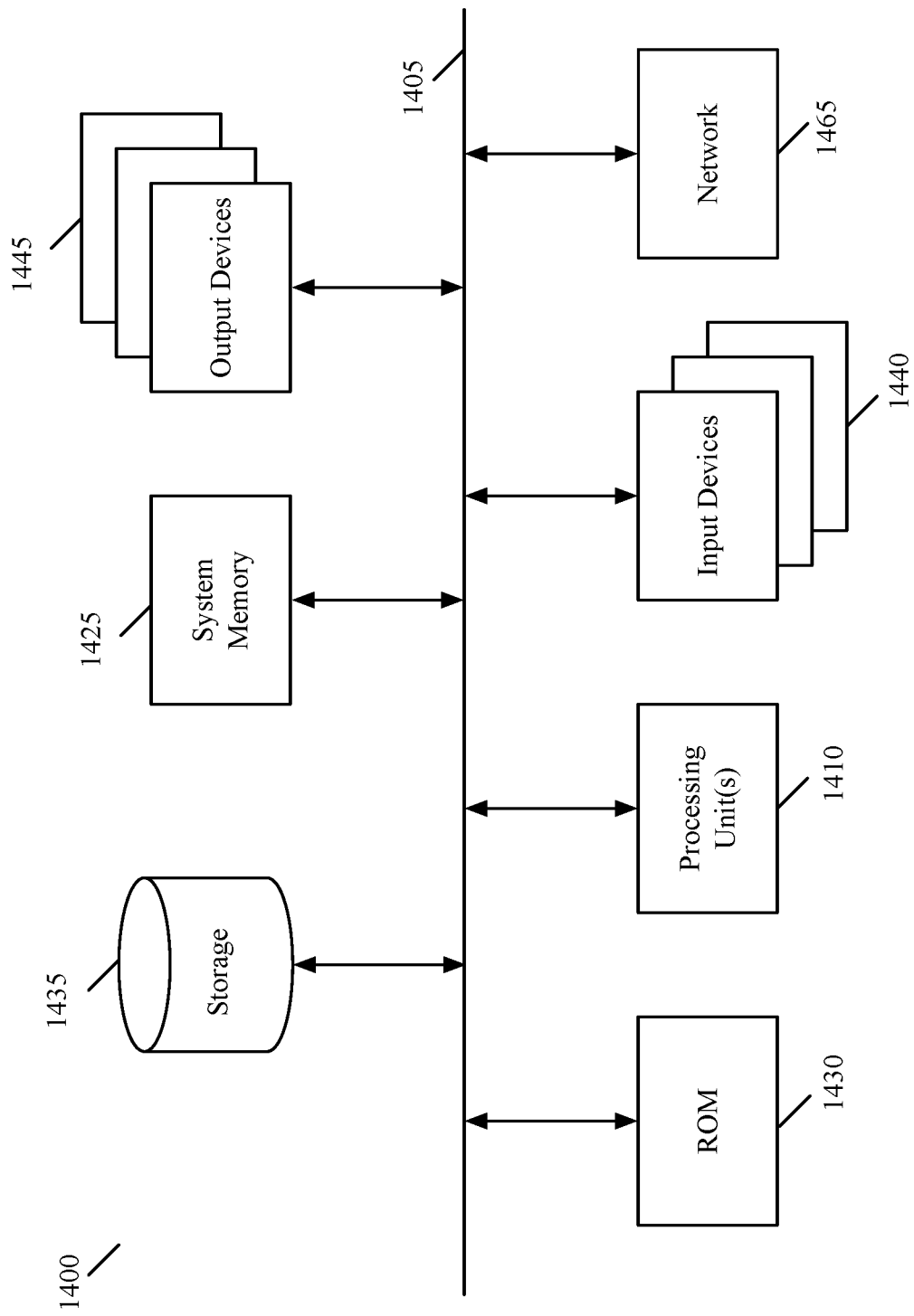
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet), or a network of networks (such as the Internet). Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. For a global server load balancing (GSLB) that is performed by a plurality of domain name system (DNS) servers to perform DNS services for a plurality of resources located at a plurality of geographically separate sites, a method for collecting health monitoring, the method comprising:
   partitioning the plurality of resources into a plurality of sets of resources;
   assigning each particular set of resources to a different particular DNS server; and
   configuring each particular DNS server (i) to receive a list of resources that need monitoring, (ii) to perform a look-up operation that computes a value for an identifier of each particular resource on the received list of resources and uses each particular resource's computed value as an index into a look-up table that specifies whether the particular DNS server is assigned the task of monitoring the health of the particular resource, (iii) to send health monitoring messages to each particular resource on the list of resources that is assigned to the particular DNS server based on the look-up operation, (iv) to generate data by analyzing responses to the sent health monitoring messages, and (v) to distribute the generated data to the other DNS servers.

2. The method of claim 1, wherein the set of resources comprises a plurality of load balancers that forward data messages to backend servers.

3. The method of claim 1, wherein the set of resources comprises different sets of load balancers that forward data messages to different sets of backend servers located at different geographical sites.

4. The method of claim 3, wherein each set of load balancers is at the same geographical site as the set of backend servers to which it forwards data messages.

5. The method of claim 1, wherein the set of resources comprises a plurality of backend servers that process and respond to data message flows.

6. The method of claim 5, wherein the DNS servers receive DNS requests for at least one application executed by each of the backend servers and in response to the DNS requests, provide network addresses to access the backend servers.

7. The method of claim 6, wherein the network addresses comprise virtual IP (Internet Protocol) addresses that direct the data message flows to a plurality of load balancers that distribute the load among the backend servers.

8. The method of claim 1, wherein the health monitoring messages comprise one of ping messages, TCP messages, UDP messages, https messages, and http messages.

9. The method of claim 1, wherein the data generated by analyzing responses to the health monitoring messages is used to identify a set of resources that have failed.

10. The method of claim 1, wherein the data generated by analyzing responses to the health monitoring messages is used to identify a set of resources that have operational characteristics that fail to meet desired operational metrics.

11. A non-transitory machine readable medium storing a program for execution by a set of processing units to collect health monitoring data in a global server load balancing (GSLB) system includes a plurality of domain name system (DNS) servers that perform DNS services for a plurality of resources located at a plurality of geographically separate sites, the program comprising sets of instructions for:
   partitioning the plurality of resources into a plurality of sets of resources;
   generating a look-up table to assign each particular set of resources to a different particular DNS server; and
   configuring each particular DNS server (i) to receive a list of resources that need monitoring, (ii) to examine the look-up table to determine whether the particular DNS server is assigned the task of monitoring the health of each particular resource on the list of resources, (iii) to send health monitoring messages to each particular resource on the list of resources that is assigned to the particular DNS server based on the examination of the look-up table, (iv) to generate data by analyzing responses to the sent health monitoring messages, and (v) to distribute the generated data to the other DNS servers.

12. The non-transitory machine readable medium of claim 11, wherein the set of resources comprises a plurality of load balancers that forward data messages to backend servers.

13. The non-transitory machine readable medium of claim 11, wherein the set of resources comprises different sets of load balancers that forward data messages to different sets of backend servers located at different geographical sites.

14. The non-transitory machine readable medium of claim 13, wherein each set of load balancers is at the same geographical site as the set of backend servers to which it forwards data messages.

15. The non-transitory machine readable medium of claim 11, wherein the set of resources comprises a plurality of backend servers that process and respond to data message flows.

16. The non-transitory machine readable medium of claim 15, wherein the DNS servers receive DNS requests for at least one application executed by each of the backend servers and in response to the DNS requests, provide network addresses to access the backend servers.

17. The non-transitory machine readable medium of claim 16, wherein the network addresses comprise virtual IP (Internet Protocol) addresses that direct the data message flows to a plurality of load balancers that distribute the load among the backend servers.

18. The non-transitory machine readable medium of claim 11, wherein the health monitoring messages comprise one of ping messages, TCP messages, UDP messages, https messages, and http messages.

19. The non-transitory machine readable medium of claim 11, wherein the data generated by analyzing responses to the health monitoring messages is used to identify a set of resources that have failed.

20. The non-transitory machine readable medium of claim 11, wherein the data generated by analyzing responses to the health monitoring messages is used to identify a set of resources that have operational characteristics that fail to meet desired operational metrics.

* * * * *